A. Weitman,
Horseshoe.
Nº 49,324.    Patented Aug. 8, 1865.

Witnesses:

Inventor:

United States Patent Office.

A. WEITMAN, OF WEST UNION, IOWA.

HORSESHOE.

Specification forming part of Letters Patent No. 49,324, dated August 8, 1865.

*To all whom it may concern:*

Be it known that I, A. WEITMAN, of West Union, in the county of Fayette and State of Iowa, have invented a new and Improved Horseshoe; and I do hereby declare that the following is a full, clear, and exact description thereof, which will enable others skilled in the art to make and use the same, reference being had to the accompanying drawings, forming part of this specification, in which—

Figure 1:
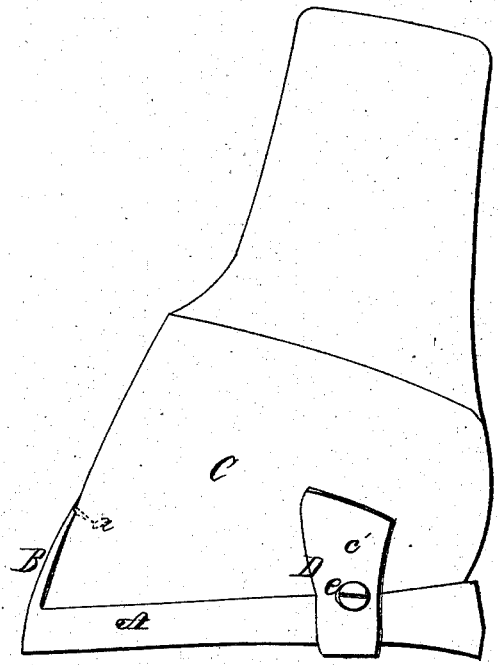
Figure 2:
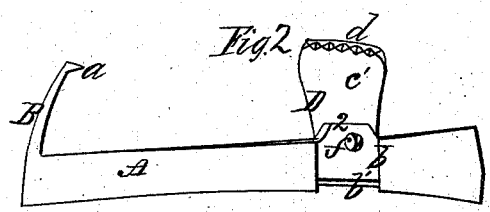
Figure 3:

Figure 1 is a side view of my invention attached to the hoof of a horse; Fig. 2, a detached side view of the same with one of the flanges removed; Fig. 3, a detached edge view of one of the flanges pertaining to the same.

Similar letters of reference indicate like parts.

This invention relates to a new and improved manner of attaching the shoe to the hoof of the animal, whereby the shoe will be firmly secured to the hoof, readily applied and detached therefrom, and some elasticity allowed the shoe in order to render the latter comfortable to the animal by relieving the hoof from jars and concussions.

A is a horseshoe, which is bent or curved in the usual form to correspond to the shape of the hoof. The front part of this shoe is provided with a flange, B, which bears against the wall of the hoof C at its front, and has a lip, $a$, at its upper end to fit into the wall of the hoof.

At each side of the shoe A, near its rear end, there is a recess, $b$. These recesses extend the whole height of the shoe, and the under sides or surfaces of the same are also notched or recessed in line with the recesses $b$, as shown at $b'$. The upper surfaces of these recesses are inclined, as shown at Fig. 3, at 1, and on the shoe there are two projections, 2 2, which are in line with the recesses $b$ $b$, and extend into the hoof when the shoe is adjusted thereto, preventing the hoof from slipping back and forth on the shoe, and also preserving the flanges hereinafter described from much strain.

D D represent two flanges, which are of bent form, the lower parts, $c$, of which extend under the shoe A and fit in the recesses $b'$. The upper surfaces of the parts $c$ are inclined, as shown at 3 in Fig. 3, to correspond with the inclination of the upper parts of the recesses $b'$. The upper parts, $c'$, of the flanges bear against the walls of the hoof, and have serrated lips $d$ at their upper ends to sink into the hoof. These flanges have screws $e$ passing through them, and the screws fit in holes $f$, provided with internal screw-threads, said holes being made in the projections 2 2.

By this arrangement it will be seen that, as the flanges D D are secured to the shoe and hoof, by turning the screws $e$ the shoe will be drawn up toward the hoof, owing to the inclined surfaces 1 3 of the recesses $b'$ in the shoe and lips $c$ of the flanges D, and the lips $d$ of the parts $c'$ will sink into the hoof; the latter resting on the lips $d$ and on the shoe in front of the flanges D D, a slight space being allowed between the hoof and the shoe, at the rear of the flanges, to admit of a certain degree of spring to ease the foot of the horse by relieving it from jars and concussions.

I would remark that both of the flanges D D need not be removable. One of them may be permanently attached to the shoe.

Having thus described my invention, I claim as new and desire to secure by Letters Patent—

1. The securing of the shoe to the hoof by means of one or more detachable or removable flanges, D, provided with lips $d$, and constructed and applied in such a manner as to draw the shoe toward the hoof and cause it to fit snugly thereto under the action of the screw $e$ and inclined surface of the parts $c$ and $b$, in connection with one or more fixed or permanent flanges, B, provided with lips $a$, substantially as described.

2. The projections 2 2, in connection with the detachable and permanent flanges, substantially as and for the purpose specified.

A. WEITMAN.

Witnesses:
 JOSEPH HOBSON,
 WILLIAM COWLE.